US012412422B2

(12) United States Patent
    Portal

(10) Patent No.: US 12,412,422 B2
(45) Date of Patent: *Sep. 9, 2025

(54) METHOD AND SYSTEM FOR VERIFYING IMAGE IDENTIFICATION

(71) Applicant: Leo Portal, Alton, IL (US)

(72) Inventor: Leo Portal, Alton, IL (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/449,576

(22) Filed: Aug. 14, 2023

(65) Prior Publication Data
    US 2023/0386255 A1    Nov. 30, 2023

Related U.S. Application Data

(63) Continuation of application No. 17/062,249, filed on Oct. 2, 2020, now Pat. No. 11,727,722.

(60) Provisional application No. 62/910,458, filed on Oct. 4, 2019.

(51) Int. Cl.
    *G06V 40/16* (2022.01)
    *G06T 7/00* (2017.01)
    *G06V 10/75* (2022.01)

(52) U.S. Cl.
    CPC ............ *G06V 40/172* (2022.01); *G06T 7/001* (2013.01); *G06V 10/751* (2022.01); *G06T 2207/30201* (2013.01)

(58) Field of Classification Search
    CPC .......... G06T 2207/30201; G06T 7/001; G06V 10/751; G06V 40/172
    See application file for complete search history.

(56) References Cited

U.S. PATENT DOCUMENTS

2018/0068173 A1*  3/2018  Kolleri .................. G06Q 10/10
2020/0104033 A1*  4/2020  Ho ....................... G06V 40/172

* cited by examiner

*Primary Examiner* — Ruiping Li
(74) *Attorney, Agent, or Firm* — NIXON PEABODY LLP

(57) ABSTRACT

A system and method for verifying the identity of a user sending a facial image is disclosed. The system includes a mobile device interface for receiving a facial image. A facial feature extractor module receives the image and determines identifying features from the facial image. An image template database stores a template image associated with the user of the mobile device. A match processing module receives the facial image and verifies the facial image with the identity of the user by comparing the identifying features with the template image.

17 Claims, 12 Drawing Sheets

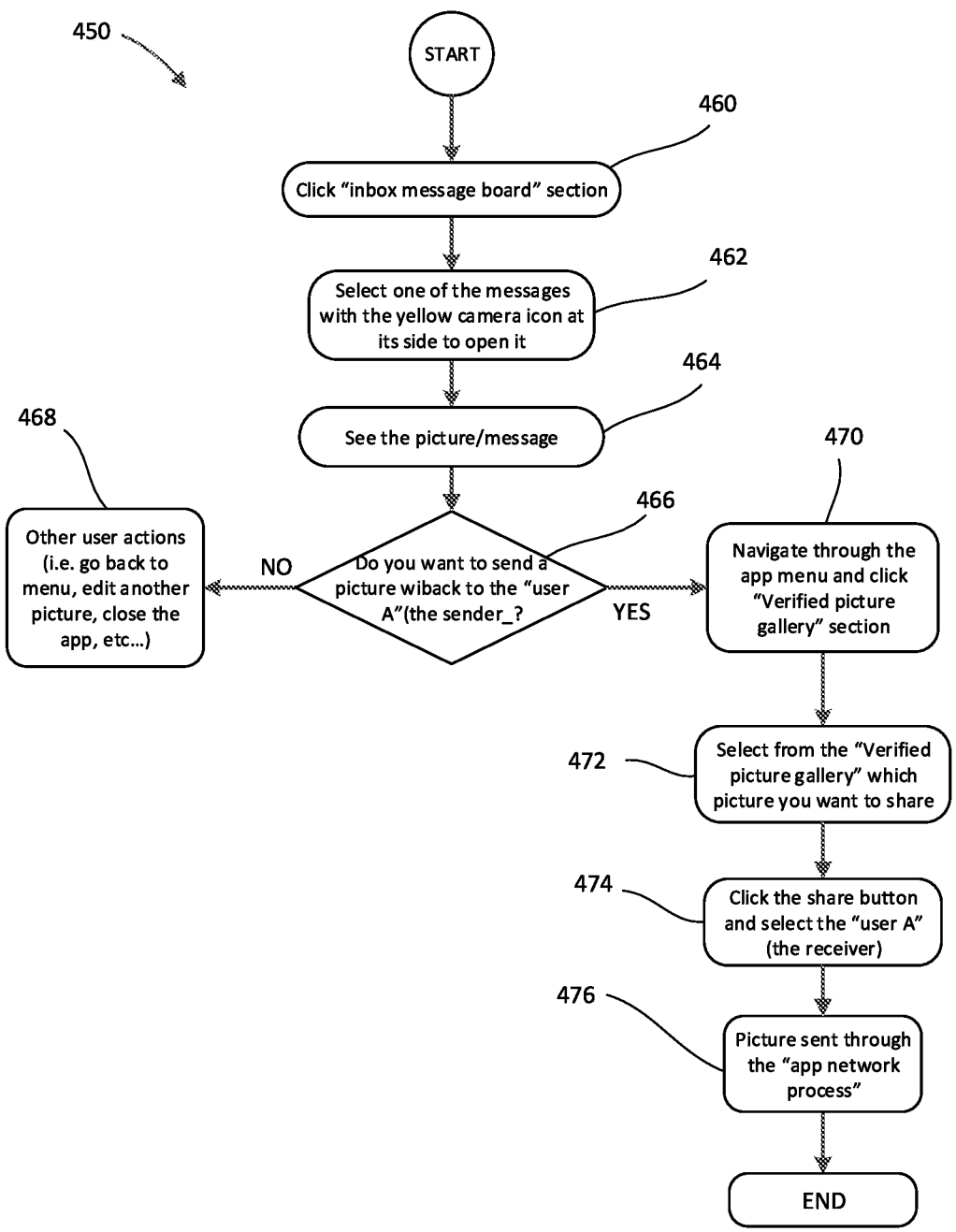

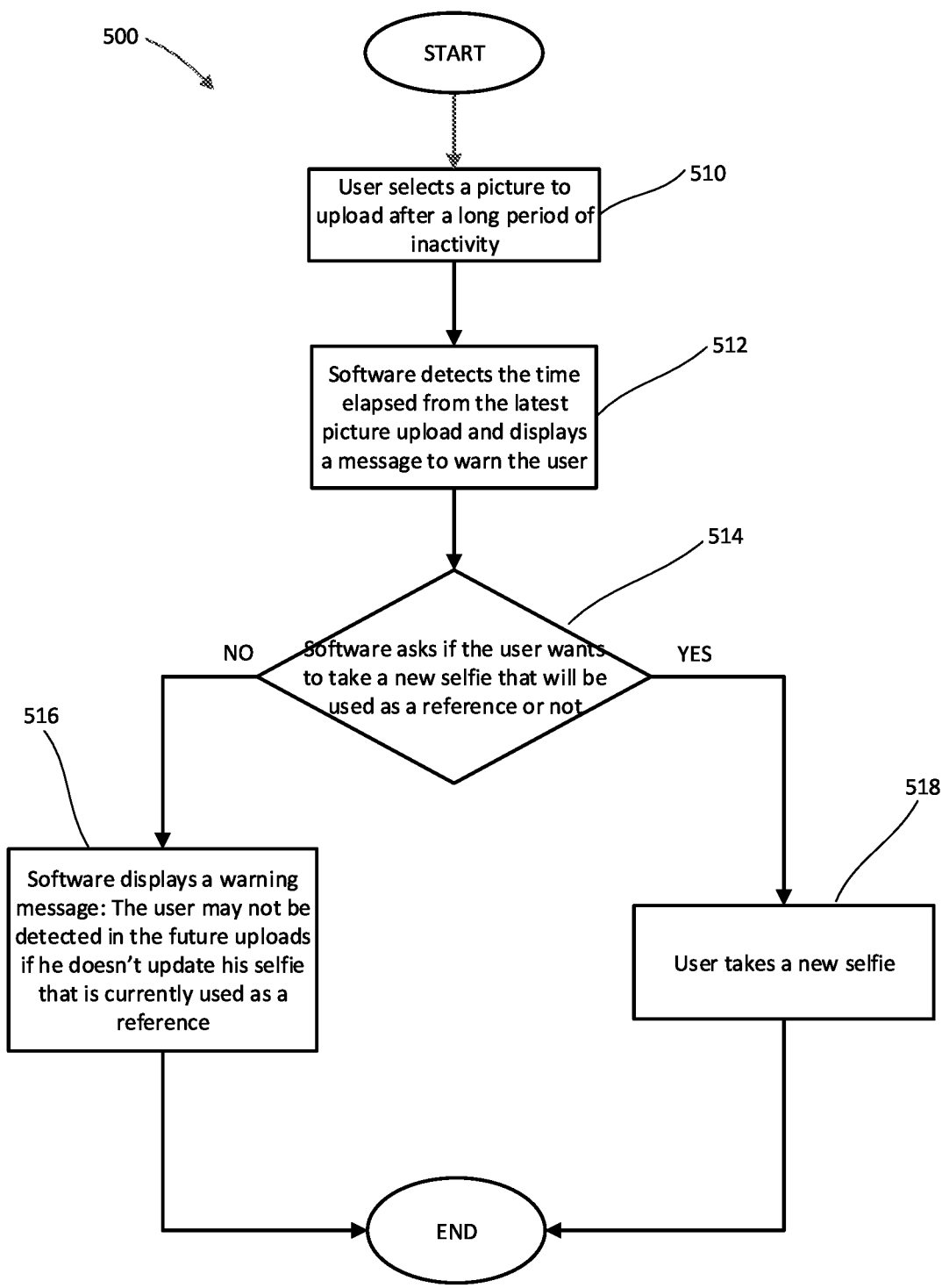

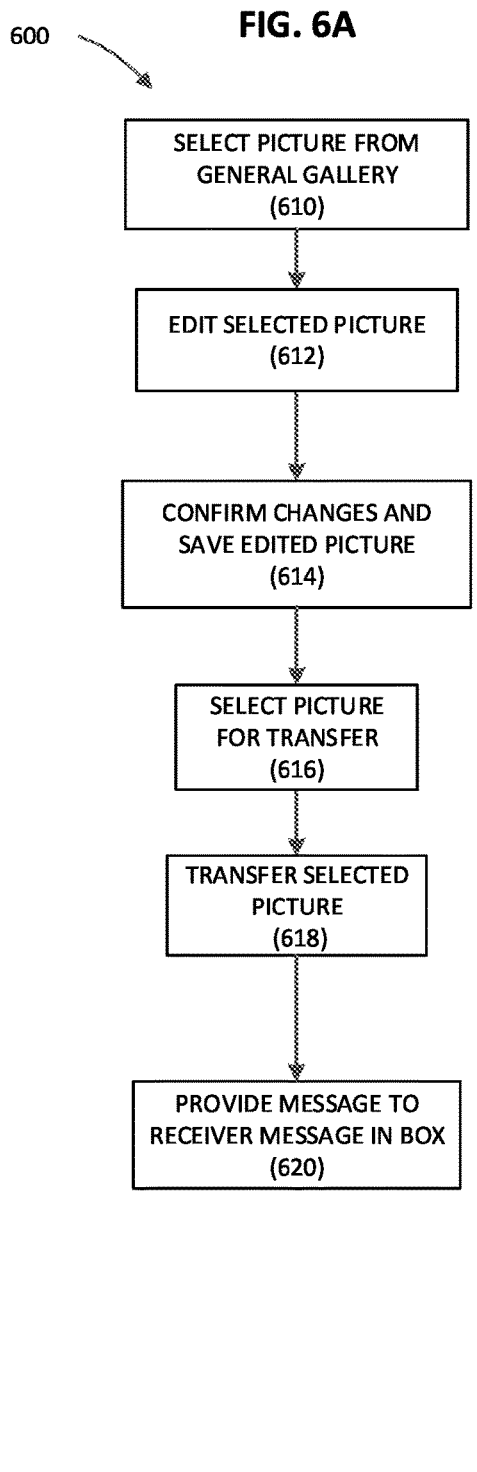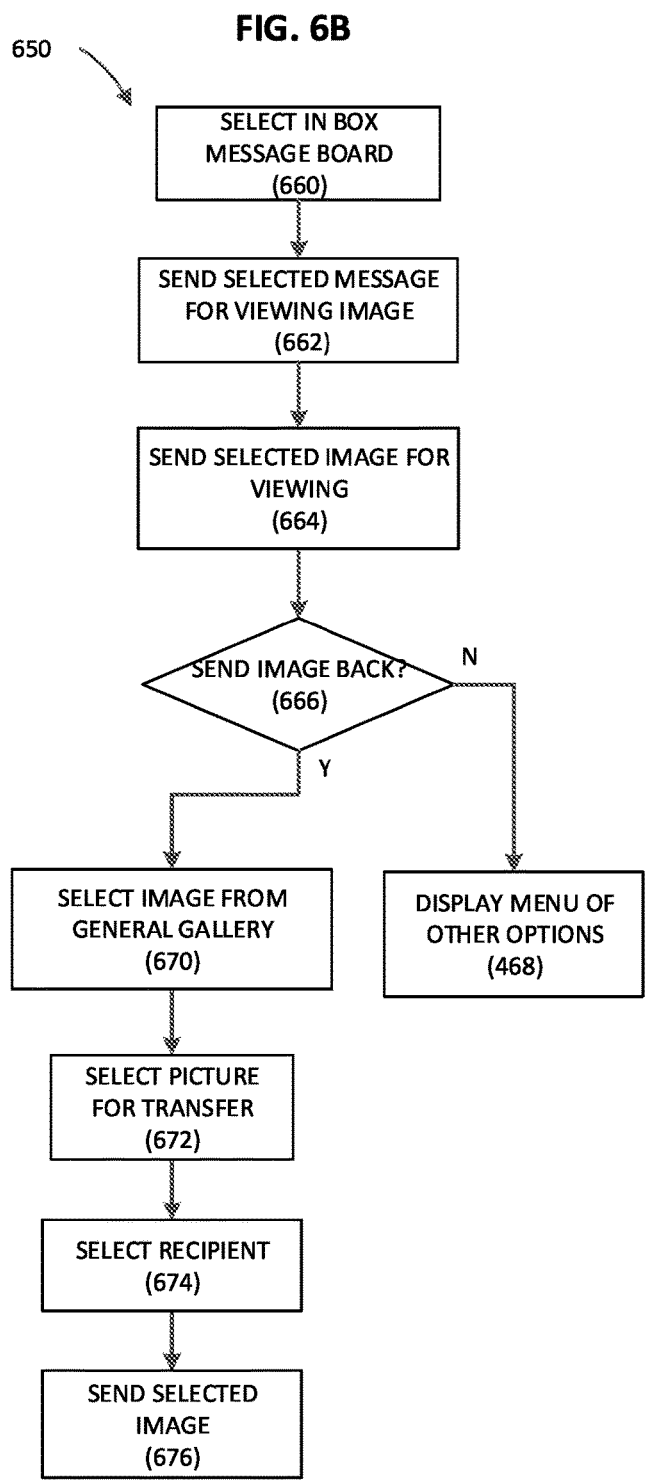

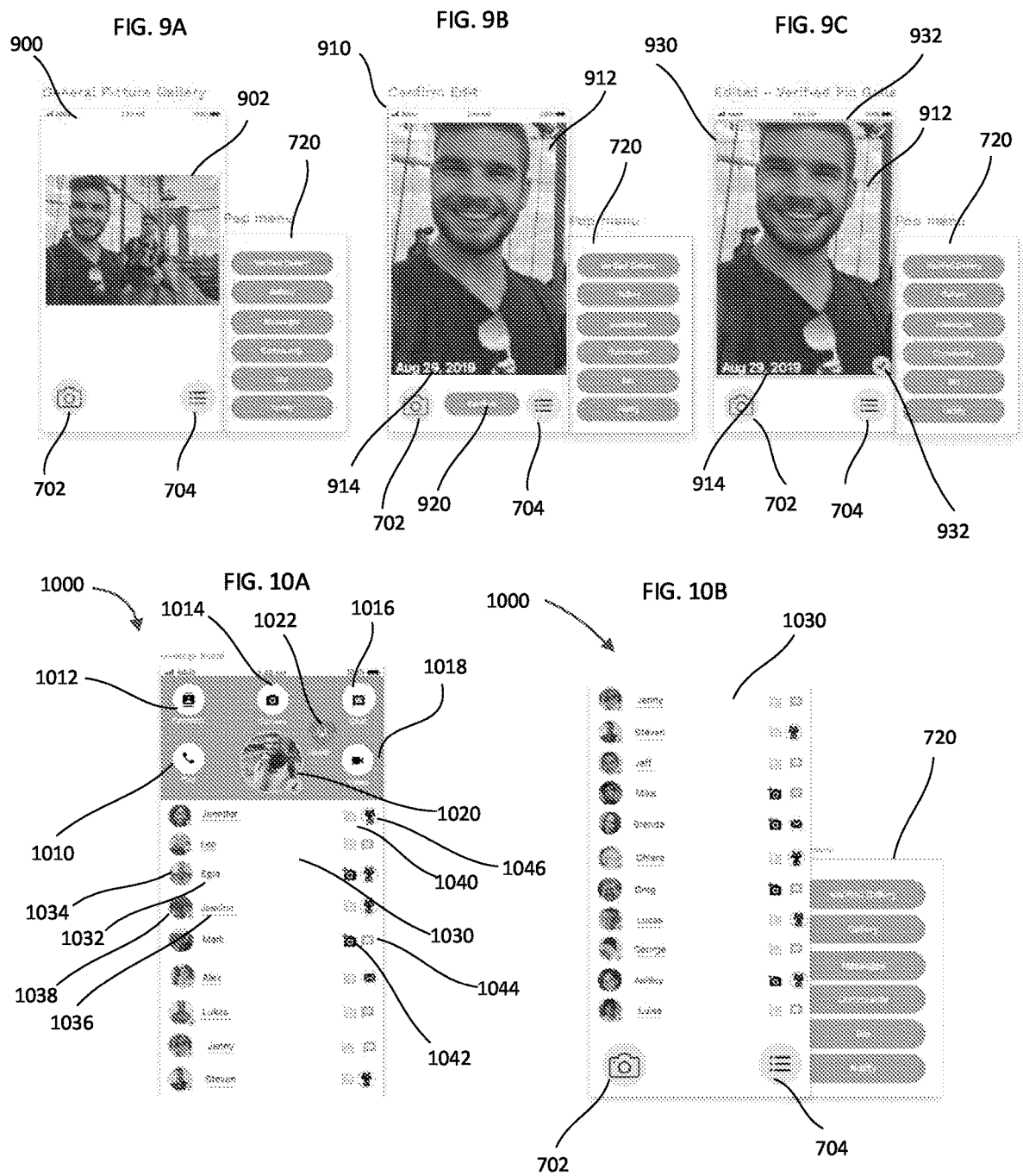

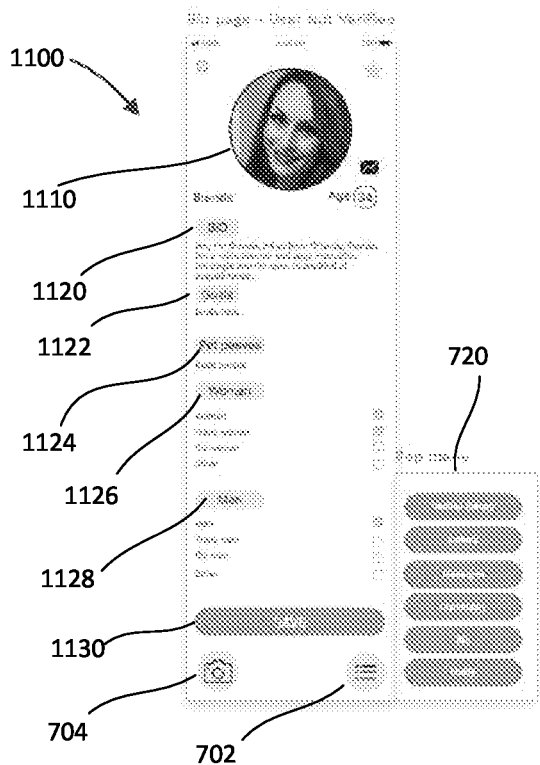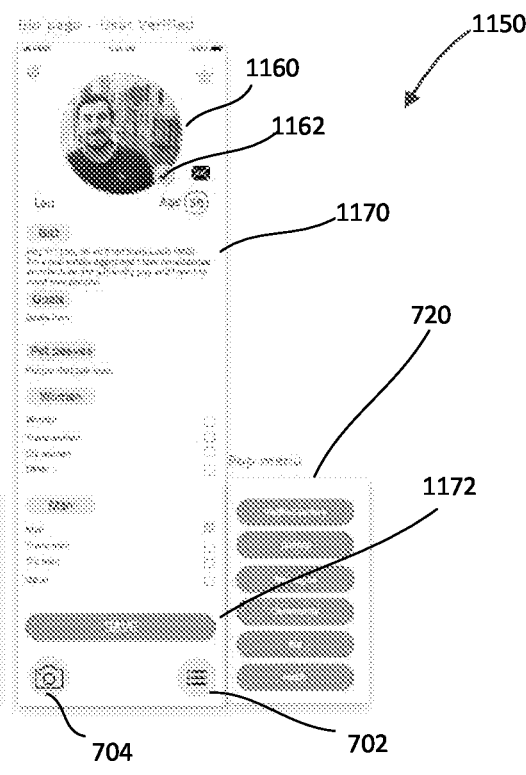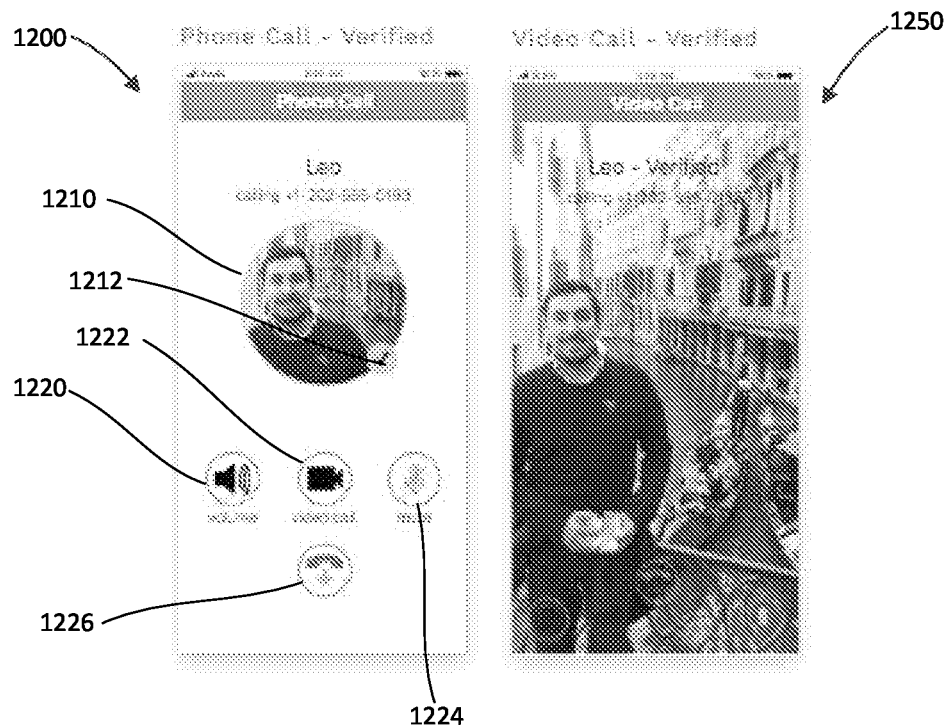
FIG. 11A FIG. 11B FIG. 12A FIG. 12B

METHOD AND SYSTEM FOR VERIFYING IMAGE IDENTIFICATION

PRIORITY CLAIM

The present disclosure is a continuation of U.S. application Ser. No. 17/062,249 filed on Oct. 2, 2020 which claims the benefit of, and priority to U.S. Provisional Application Ser. No. 62/910,458, filed Oct. 4, 2019. The contents of those applications are hereby incorporated by reference in their entireties.

TECHNICAL FIELD

The present disclosure relates generally to visual identification verification. More particularly, aspects of this disclosure relate a system that verifies authenticity of a picture of a user that is compared to an initially stored template picture of the user.

BACKGROUND

The advent of smartphones has allowed users to exchange images or pictures of themselves. Such pictures are increasingly used to identify persons to others who have only communicated with a person digitally. There is therefore a great need for verification of pictures or images of a person. For example, there are numerous organizations utilizing digital profile pictures, hardware components storing profile pictures, computer systems analyzing profile pictures, computer processes and the like, that capture a picture, and then store and link these digital pictures to a digital profile or identity of a person. This profile picture is used or provided at any time thereafter for representation and/or comparison of a person's digital identity or likeness.

Such a profile picture process is followed in numerous applications such as healthcare patient image profiles, social network image profiles, ride share (driver/passenger) image profiles, department of motor vehicle profiles, marketing image profiles, cloud computing image profiles, employer image profiles, keyless entry image profiles, Email image profiles, insurance image databases, census counts, government voting, private sector voting, and government image profiles.

Unfortunately, there is no current reliable method to determine whether a person actually is the person in an image. This may result in instances of potential fraud. For example, one recent issue is misrepresentation on line commonly referred as "online catfishing." Online catfishing is when an online user misrepresents someone else's picture as their own in order to defraud a victim, seek revenge, or commit identity theft.

Thus, there is a need for a system that allows verification of personal images from a user. There is a need for a system that allows storage of verified pictures in a gallery for sending to other users. There is a need for a system that allows a user to change a verified picture.

SUMMARY

One disclosed example is a system for verifying the identity of a user, the system includes a computing device interface for receiving a facial image from a computing device of the user. A facial feature extractor module receives the facial image and determines identifying features from the facial image. An image template database is coupled to the facial feature extractor module. The image template database stores a template image associated with the user. A match processing module receives the facial image and verifies the facial image with the identity of the user by comparing the determined identifying features with the template image.

A further implementation of the example system is an embodiment where the system includes a verified image gallery database coupled to the facial feature extractor module. The match processing module stores the facial image as a verified image in a verified image gallery associated with the user in the verified image database. Another implementation is where the interface on the computing device allows a display of verified images in the verified image gallery. The displayed images are marked with an indication of verification. Another implementation is where the computing device accesses an image from the verified image gallery for transmission to another computing device. The transmitted image includes an indicator that the image is verified. Another implementation is where the system includes a general image gallery database coupled to the facial feature extractor module. The match processing module stores the facial image in a general image gallery associated with the user in the general image gallery database if the image is not verified. Another implementation is where the computing device is operable to edit an image stored in the general image gallery associated with the user to meet the criteria of a verified image. The match processor stores the edited image in the verified image gallery. Another implementation is where the verification includes determining biometric features from the facial image, comparing biometric features with those of the template image, and verifying if the biometric features exceed a predetermined threshold in comparison to the template image. Another implementation is where the verification includes determining whether there is another person in the facial image, or whether the image does not show any persons. Another implementation is where the computing device is a mobile device including a camera. Another implementation is where a time stamp is applied when the image is obtained by the application on the computing device. Another implementation is where the computing device is operable to edit the image, and where a time stamp is applied when the image is edited. Another implementation is where the computing device displays a message board including indicators of a message from another user and an indicator that a verified image of the another user is attached to the message.

Another disclosed example is a computing device including an application operable to provide verification of an image of a user. The computing device includes a display and a camera operable to capture an image. A controller is operated by the application to capture an image. The controller verifies whether the image shows the user based on biometric features in comparison to biometric features of a template image of the user. The controller stores the image as a verified image of the user.

A further implementation of the example computing device is an embodiment where the computing device includes a transceiver. The controller is operable by the application to display verified images from a verified image gallery associated with the user on the display. The controller allows the user to select one of the verified images to be sent to another device via the transceiver. Another implementation is where the displayed verified images are marked with an indication of verification. Another implementation is where the controller selects a verified image on the display for transmission to another computing device. The transmitted image includes an indicator that the image is verified.

Another implementation is where the controller is operable by the application to store the image in a general picture gallery if the verified criteria are not met. Another implementation is where the verified criteria is whether the user is alone in the image. Another implementation is where the controller is operable by the application to edit an image stored in the general image gallery associated with the user to meet the criteria of a verified image. The controller is operable to store the edited image in the verified image gallery Another disclosed example is a method of verifying the identification of an image of a user. A template image associated with the user is stored in a template image database. A facial image from a computing device operated by the user is received. Identifying features are determined from the facial image via a facial feature extractor module. The facial image is verified with the identity of the user by comparing the identifying features with those of the stored template image via a match processor.

Another implementation of the example method includes storing the facial image as a verified image in a verified image gallery associated with the user in a verified image database. Another implementation is where the method includes displaying an interface on the computing device having verified images in a verified image gallery associated with the user in a verified image gallery database. The displayed images are marked with an indication of verification. Another implementation is where the method includes accessing an image from the verified image gallery for transmission to another computing device. The transmitted image includes an indicator that the facial image is verified. Another implementation is where the method includes storing the facial image in a general image gallery associated with the user in a general image gallery database if the facial image is not verified. Another implementation is where the method includes generating an interface allowing editing an image stored in the general image gallery associated with the user to meet the criteria of a verified image. The method also includes storing the edited image in the verified image gallery. Another implementation is where the verification includes determining biometric features from the facial image, comparing biometric features with those of the template image, and verifying if the biometric features exceed a predetermined threshold in comparison to the template image. Another implementation is where the verification includes determining whether there is another person in the facial image, or whether the facial image does not show any persons. Another implementation is where the computing device is a mobile device including a camera. Another implementation is where the method includes applying a time stamp when the image is obtained by the computing device. Another implementation is where the method includes displaying an interface to edit the image, and applying a time stamp when the image is edited. Another implementation is where the method includes displaying a message board including indicators of a message from another user and an indicator that a verified image of the another user is attached to the message.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 4B is a flow diagram of the routine for sending images from the verified gallery to a requesting user;

FIG. 5 is a flow diagram of a routine to update a template image for a user;

FIG. 6A is a flow diagram of the routine for editing pictures in a general gallery;

FIG. 6B is a flow diagram of the routine for sending images from the general gallery to a requesting user;

FIGS. 9A-9C are screen images of generated interfaces for the process of transferring an edited image from a general picture gallery to a verified picture gallery;

FIGS. 10A-10B are a screen image of a message board interface generated by the example application;

FIGS. 11A-11B are screen images of bio interfaces generated by the example application;

FIGS. 12A-12B are screen images of the phone interface and the video call interface.

Figure 1:
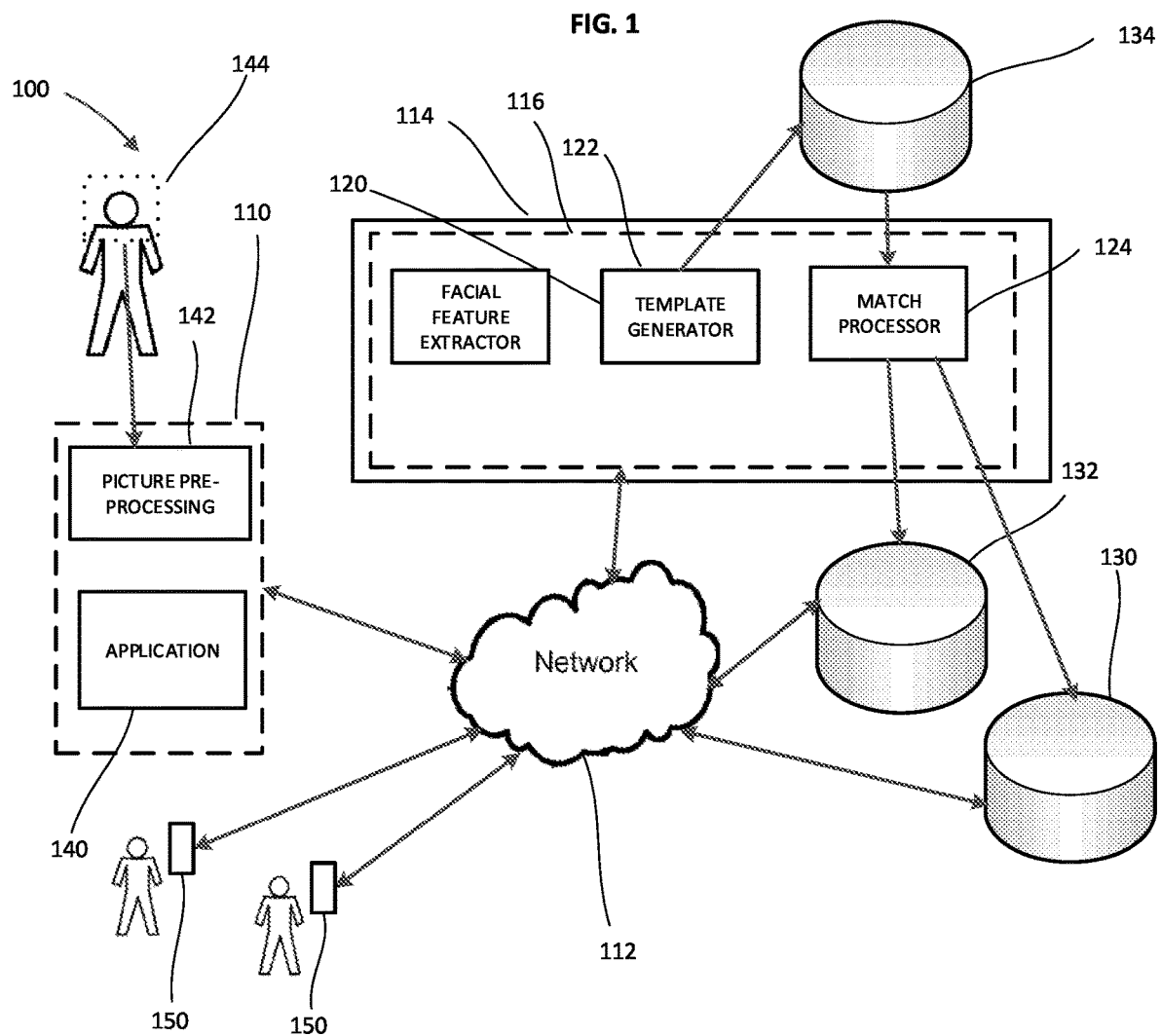
FIG. 1 is a block diagram of an example verification system and the process of facial recognition based on a collected confirmed template image.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of" or "within acceptable manufacturing tolerances," or any logical combination thereof, for example.

The examples disclosed herein include a cloud based system to address fraudulent activity involving misrepresentation of another person (or persons') identity in the real world and in the digital or online world. The example system addresses online catfishing by verifying real people for online users who use or share profile pictures in an effort to verify one's identity.

The example system includes a software procedural process limiting the exchange and filing of pictures with other people in order to authenticate a digital representation of a person's true identity. The example profile picture process includes specific procedures of how profile pictures are stored (not co-mingled), edited, and transferred. Through facial recognition metadata encrypted process, all users can legitimately verify and authenticate digital profile pictures that they see and share with each other.

The example system creates a safe and predictable online experience for all users that rely on a profile picture for their identity. Knowing that a profile picture matches the identity of the person ends misrepresentation, or malicious hackers from copying other profile pictures of others, that they pass off as their own. The system utilizes encryption process to further secure end-to-end messaging encryption, which protects the original picture or image from being altered or misrepresented.

FIG. 1 shows an image identity verification system 100. As will be explained, the system 100 in FIG. 1 allows different routines and processes for storing images of users and verifying subsequent images for purposes of user identification verification. The example system 100 includes an application executing on a mobile device 110, such as a smart phone, that is capable of capturing digital images such as pictures of a user. The mobile device 100 is communicatively coupled to a network 112. A cloud server 114 is coupled to the network 112. The cloud server 114 executes a Cloud based API 116 to manage received images for picture identity registration, picture verification and picture storage purposes. It is to be understood that there may be multiple users with similar mobile devices such as the mobile device 110 that may access the verification system 100. In this example, the mobile device 100 may include smartphones manufactured by Apple or Samsung, with different mobile operating systems such as Apple or Android operating systems. Any computing device that includes the ability to capture images and execute the necessary applications and APIs described herein may be substituted for the mobile device 110.

The API 116 includes a facial feature extractor module 120, a picture template generator 122, and a match processor 124. In this example, the facial feature extractor module 120 may be any appropriate application that determines biometric features from facial images and compares them to a known set of biometric values associated with an individual to confirm recognition of an individual. Examples of such applications include Amazon Rekognition, Google Vision—Microsoft Azure, Vision Insight, Deep Vision, FaceFirst, DeepFace, Ever AI, Trueface, Face++, Clarifai, Kairos, Churchix, Sentinel, OpenBR, Flandmark, OpenFaceTracker, OpenEBTS, iFace, vFace, am Zenus Biometrics. The server 114 is coupled to a general picture gallery database 130, a verified picture gallery database 132, and a template picture database 134. The galleries 130 and 132 and the template storage 134 may include storage devices or storage servers that can store multiple images or digital pictures in a suitable graphic format such as JPEG 2000, Exif, JPEG/JFIF, BMP, HEIF, SVG, PNG, GIF, and TIFF. The biometric data derived from the images may be stored on either the server 114 or the mobile device 110 depending on factors such as system settings or user preference.

The mobile device 110 in this example executes an identification verification application 140 and a picture pre-processing API 142. The picture pre-processing API 142 captures the picture or image from a digital camera on the mobile device 110. In this example, the facial recognition process is performed in the Cloud, but the example mobile device 110 may execute the facial recognition API modules described herein. In this example, the application 140 will instruct a user to capture a facial image 144 of themselves using the camera in conjunction with the pre-processing API 142 on the mobile device 110. The captured facial image 144 is transmitted via a wireless communication channel through the network 112 to the Cloud based server 114.

The captured image or picture 144 taken with the application 140 on the mobile device 110 is required for an enrollment process to begin. In a picture pre-processing" stage, the facial image 144 is captured and is routed to the facial feature extractor module 120 via the network 112. The facial feature extractor module 120 analyzes the received picture for authentication of a singular person with stored facial features. The facial feature extractor measures and analyzes the proportional distance of each component of the human face. Such components and measurements can include the respective size and distance from each other as it relates to the forehead, eyes, eyebrows, ears (i.e. the outer ear aka. the auricle or pinna). The forehead may comprise the skin beneath the hairline and bordered laterally by the temples and inferiorly by eyebrows and ears. The eyes sit in the orbit and are protected by eyelids and eyelashes. The distinctive human nose shape, nostrils, and nasal septum may be analyzed. The cheeks, covering the maxilla and mandibula (or jaw), the extremity of which is the chin may be analyzed. The mouth, with the upper lip divided by the philtrum, sometimes revealing the teeth may be analyzed. The system may also recognize the emotion of a human being such as happiness or sadness and the following facial attributes such as smiling, emotions, eyes open, mouth open, facial hair such as mustaches or beards, as well as eyeglasses or sunglasses, and gender. These features may be used by other applications that access the verification application for purposes such as additional screening for images that might be used to determine the image meets the terms of service for the application. The system may also recognize explicit and suggestive adult content such as nudity, sexual activity, adult toys, weapons, or self injury for these purposes.

If a single person is identified in the picture, the picture will be routed to the picture template generator module 122 and saved as an identification image template for the user in the template database 134. If more than one person is identified in the picture and/or the image does not include a person, the picture will automatically be routed to the general picture gallery database 130. Thus, the galleries 130 and 132 serve to segregate files including images that are presented by the API 116 in order to avoid indiscriminate commingling of other images. The galleries 130 and 132 store pictures that have either been verified or have been loaded by a user. The users of the API 116 cannot indiscriminately organize pictures outside of the API rules when accessing the API 116.

The template generator 122 copies the template picture for the enrollment process and saves the template picture to the safely stored picture template database 134 where it is associated with the user. The image template stored in the template database 134 is a safely stored picture template associated with the user. This image template may then be used for comparison to other pictures received that are associated with the individual user by the match processor 124. The new pictures may be taken by the application 140 using the camera on the mobile device 110 or uploaded to the application 140 from a storage device or received from another device, or other applications such as photo-sharing applications, common storage applications such as Google Drive or Drop Box, and local files. Such pictures will be processed by the picture preprocessing API 142 and sent to the facial feature extractor 120 of the API 116 to extract facial features. The facial features of the new picture will be provided to the match processor 124 for comparison with the template picture of the user. A successful match will allow the user to be validated as the person associated with the template picture.

The match processor 124 thus decides if new pictures are verified as the user and are routed to the verified picture gallery database 132 or if not verified, the new pictures are routed to the general picture gallery database 130. In this example, the verified picture gallery 132 has a file associated with each individual user. All pictures saved in this file will be of one user with biometrical features identical to the template image of the user in the picture template database 134. The general picture gallery 130 saves all pictures that either did not match the template image, as well as if the image includes more than one person, and/or if the picture lacks a person.

In this example, the API 116 may be accessed from other sources such as by social media platforms and/or car sharing applications that include profile pictures. These sources may include applications running on mobile devices such as smart phones or tablets, or other computing devices. Profile picture verifications are stored in the verified picture gallery database 132. The picture verifications in this example include a time/date stamp. The verifications may be displayed in an interface that provides visual indicators in relation to their status on any device accessible by a user of the API 116. For example, an interface may be generated for all verified pictures of the individual. In this example, a yellow check symbol may be displayed next to their verified pictures, and a yellow border may be provided around their verified pictures. Of course other shapes, colors, and indicators may be used for the interface to designate verified pictures.

When a picture is transferred from the verified picture gallery database 132 to other users or persons accessing the API 116, an indicator or notification is provided designating the picture as verified. For example, if a picture is transferred to a social media message board, an icon such as a yellow camera icon appears in the message inbox. The indicator such as the yellow camera icon indicates that a picture has been received from another user from their file in the verified picture gallery database 132. Other indicators may be used to indicate the sender's identity is verified. Indicators may also be used to indicate other information. For example, a heart pulse may be provided, which if illuminated, is an indication that a community member has shared their STD results through a notification feature.

The system 100 also allows a user to edit a picture using an interface generated by the application 140 on the mobile device 110. The editing interface allows a user to zoom in, crop, or write text with the picture managed by the system 100. Such edited pictures that originate from the verified picture gallery database 132 remain in the verified picture gallery database 132 for future use. In this example, the edited picture will have a date stamp and a yellow check icon next to their displayed profile picture. The date stamp is applied to indicate when the image has been captured. As explained below, an additional stamp will be added if the image is edited. A yellow border will be provided around any profile pictures when accessed by the application or other platforms. In this example, images and pictures that are uploaded from other sources separate from the process of the API 116 (i.e., Google Drive, Photobucket etc.) will have a date and time stamp when the image is uploaded. In this example, this time stamp and other relevant details is visible when a user holds their finger on picture. For example, another detail is a time stamp indicating when the picture was edited.

In order to maintain singular representation of a user's identity, when a picture is uploaded for verification but not captured using the process managed by the API 116, the picture will always be processed and compared to the template image, and then assigned to either the verified profile gallery 132 or the general picture gallery 130. A picture accessed from the general picture gallery database 130 will not have a date stamp or an indicator such as a yellow check symbol. In addition, a different border, such as a black border, may be provided around the picture to indicate that the picture is not verified. Users can also send verified profile pictures or general pictures for the respective verified profile gallery 132 or the general picture gallery 130 from other sources such as outgoing digital cellular calls, text messaging, and video conferencing that do not access the API 116. Pictures stored in the general gallery 130 or the or the verified gallery 132 are available through a menu having share or download option that will allow users to download and share pictures in the galleries 130 and 132 to other platforms such as social media accounts, computers, and mobile devices via texts, emails, and JPEG files. Information such as the date the image was captured, the date the image of uploaded, and the date the image was edited is stored with the image in the respective database 130 or 132.

The application 140 may be replicated on other mobile devices 150 that are associated with other users. The other mobile devices 150 are in communication with the API 116 through the network 112. The other users of the mobile devices 150 also have template images associated with themselves stored in the template image database 134. Each of the users of the other mobile devices 150 may also have images or pictures stored in a verified picture gallery associated with that user stored in the verified picture gallery 132 or images and pictures stored in a general picture gallery associated with that user store in the general picture gallery 130.

Figure 2:
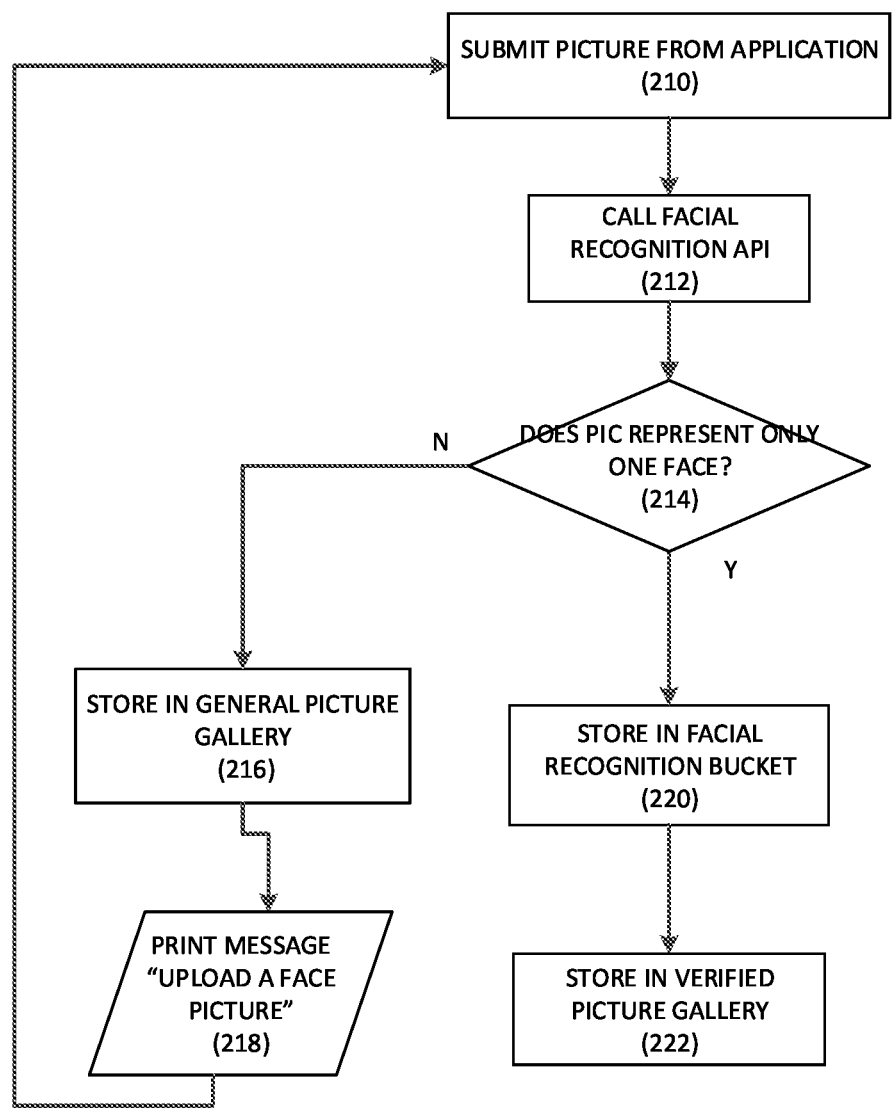
FIG. 2 is a flow diagram of a first time log in routine to capture a template image associated with a user.

FIG. 2 is a flow diagram of the first log in routine of the system 100 that allows a user to load a first identity template picture of the user. This process represents the first time login or registration flow chart for the application 140 and recognition API 116 in FIG. 1. The match processor 124 queries and decides where to store the pictures based on the analysis of the image.

When a picture is taken with the application 140 operating the mobile device 110, the picture is submitted to the API 116 (210). The API facial recognition module 120 is called (212) by the cloud server 114 and the submitted picture is analyzed by the match processor 124. The match processor 124 requests a decision based on preset terms and conditions, such as whether the picture represents only one face (214). The match processor 124 thus determines whether the picture represents only one face in this example. The match processor 124 requests facial recognition from the picture based on biometric analysis.

If picture represents more than one face (214), the submitted picture will be routed to the general picture gallery 130 (216). The user is not allowed to upload/save any subsequent pictures in the verified picture gallery 132 unless a successful template image is received and verified. A request will be made to upload a face picture when there are no pictures in the verified picture gallery 132 relating to the user (218). The routine then returns to determining whether a picture has been submitted (210).

If the answer to the query whether the picture includes one face is yes (214), the picture is stored in a facial recognition bucket that is created in the template database 134 (220). Until there is a profile picture for the user in the template database 134 and available through the bucket, all subsequent pictures will be saved in the general picture gallery database 130. The facial recognition bucket is a cloud storage filing system of the template database 134, which is commonly used to store and/or for retrieval of digital information such as pictures. In this example, the bucket is where the template image is stored and used for comparison of all other uploaded pictures prior to being assigned to the general gallery 130 or the verified gallery 132.

If the submitted picture only has one face, the match processor 124 will save and store the picture in the facial recognition bucket of the template database 134 (222). The match processor 124 will also store the picture in the safely stored picture template file of the user in the template database 134.

After completion of the initial registration routine in FIG. 2, the stored template picture in the template database 134 will always be used for future decision making analysis for other received pictures. All subsequent pictures obtained by the application 140 as well as uploaded pictures from other sources will be compared to the template picture before the match processor 124 makes a decision to save the new picture in either the verified picture gallery database 132 or the general picture gallery database 130.

Figure 3:
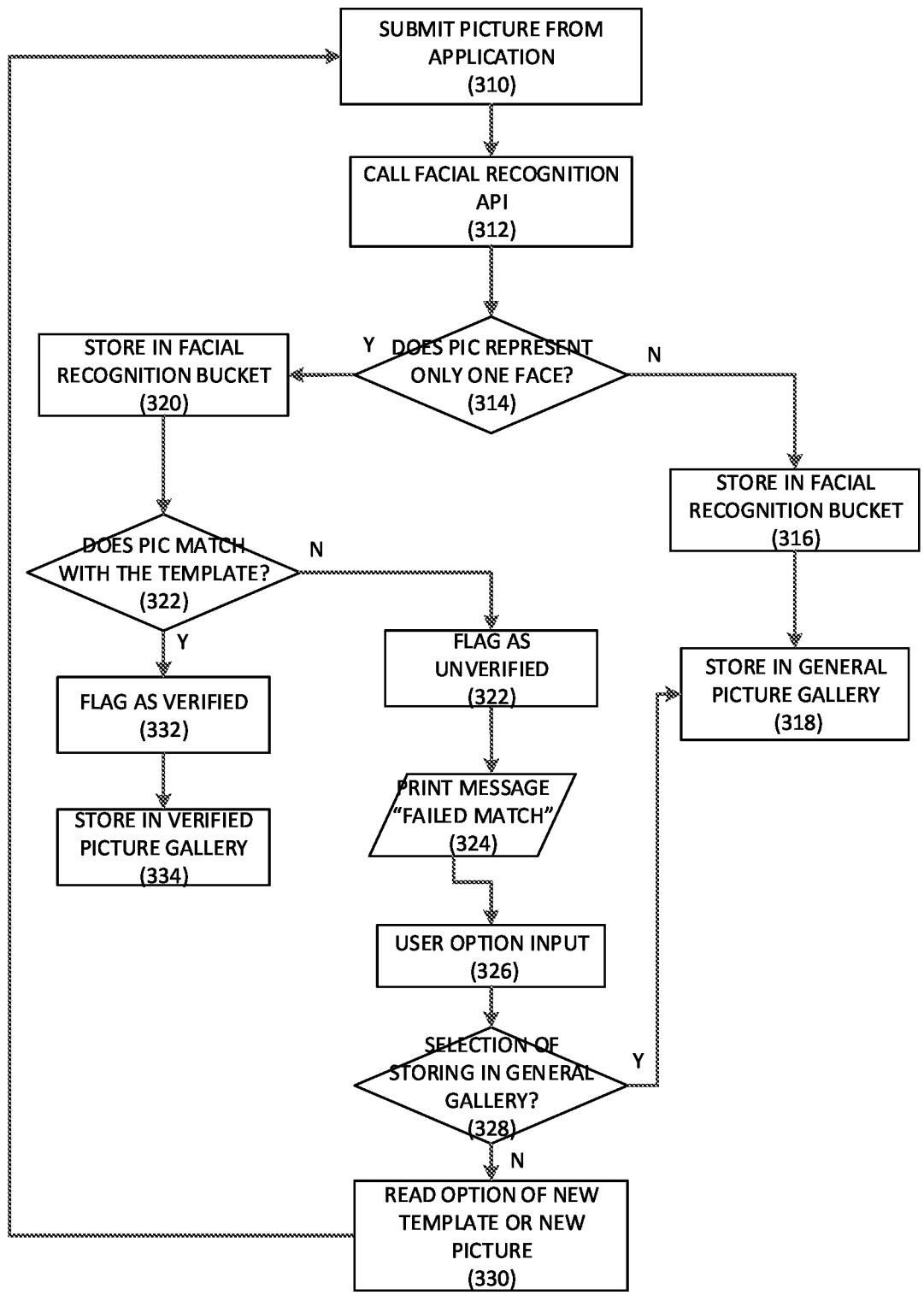
FIG. 3 is a flow diagram of a subsequent log in routine to allow confirmation of a new image against a template image.

FIG. 3 is a flow chart for a routine 300 run for users who log in to the API 116 after the first time login/registration in FIG. 2 where a user has enrolled/registered a template picture. The initial picture is saved in the safely stored picture template file for the user in the template database 134 for the software cloud facial recognition bucket for the user as explained above. The match processor 124 queries and decides where to store pictures based on the user answers received by API 116.

When a new picture is taken by the application 140 on the mobile device 110, the picture is submitted to the API 116 (310). The API facial recognition module 116 is called (312) by the cloud server 114 and the picture is analyzed by the match processor 124. The match processor 124 determines whether the picture represents only one face (314). If the picture includes more than one face, the match processor 124 stores the picture in the facial recognition bucket associated with the general picture gallery database 130 (316). The picture is then stored in the general picture gallery 130 (318).

If the picture includes only one face, the match processor 124 stores the picture in the facial recognition bucket for comparison with the template image (320). The match processor 124 then determines whether the picture matches with the template image associated with the user by the facial recognition biometric analysis process (322). If the received picture does not match the template image, the picture is flagged as unverified (324). The API 116 then outputs a message to the user through the application 140 that the picture failed to match the template image (326). The user then inputs an option from submitting a new picture, storing the picture in the general gallery, or including a new template image. The input is read and it is determined if the user requests storage in the general picture gallery in the general gallery database 130 (328). If the input is storing the picture in the general picture gallery, the routine stores the picture in the general picture gallery database 130 (318). If the user decides to create a new template image or takes a new picture (330), the routine loops back to receive another picture from the application 140 (310). If the picture matches the template image, the picture is flagged as verified (332). The picture is then stored in the verified picture gallery database 132.

When a picture is taken with the application 140 or a stored picture is uploaded by the application 140, the picture is analyzed by the match processor 124. The API 116 then requests the facial recognition operation for facial recognition biometric analysis of the received picture. Requests of the match processor 124 for a decision whether to proceed based on preset terms and conditions, such as whether there is more than one person in the picture and whether the biometric features match those of the template image. If the answer to the query of the match processor 124 is negative such as only one person in the picture, then the submitted picture will be compared to both the safely stored picture template in the template database 134 and in the software cloud bucket for analysis.

If the submitted picture matches the template image in the template database 134 for the software cloud bucket, the image will be stored in the verified picture gallery database 132. If the submitted picture does not match the template image in the template database 134 software cloud bucket, the image is stored in the general picture database 130.

An internal notification to the user will be made of a failed match to confirm that submitted picture did not match both the image in the template database 134 and the software cloud bucket during the analysis. If the answer to the query in relation to whether there is more than one person in the submitted picture is yes, than the submitted picture is not compared to the image in the bucket. The image is stored in the general picture gallery database 130.

Figure 4A:
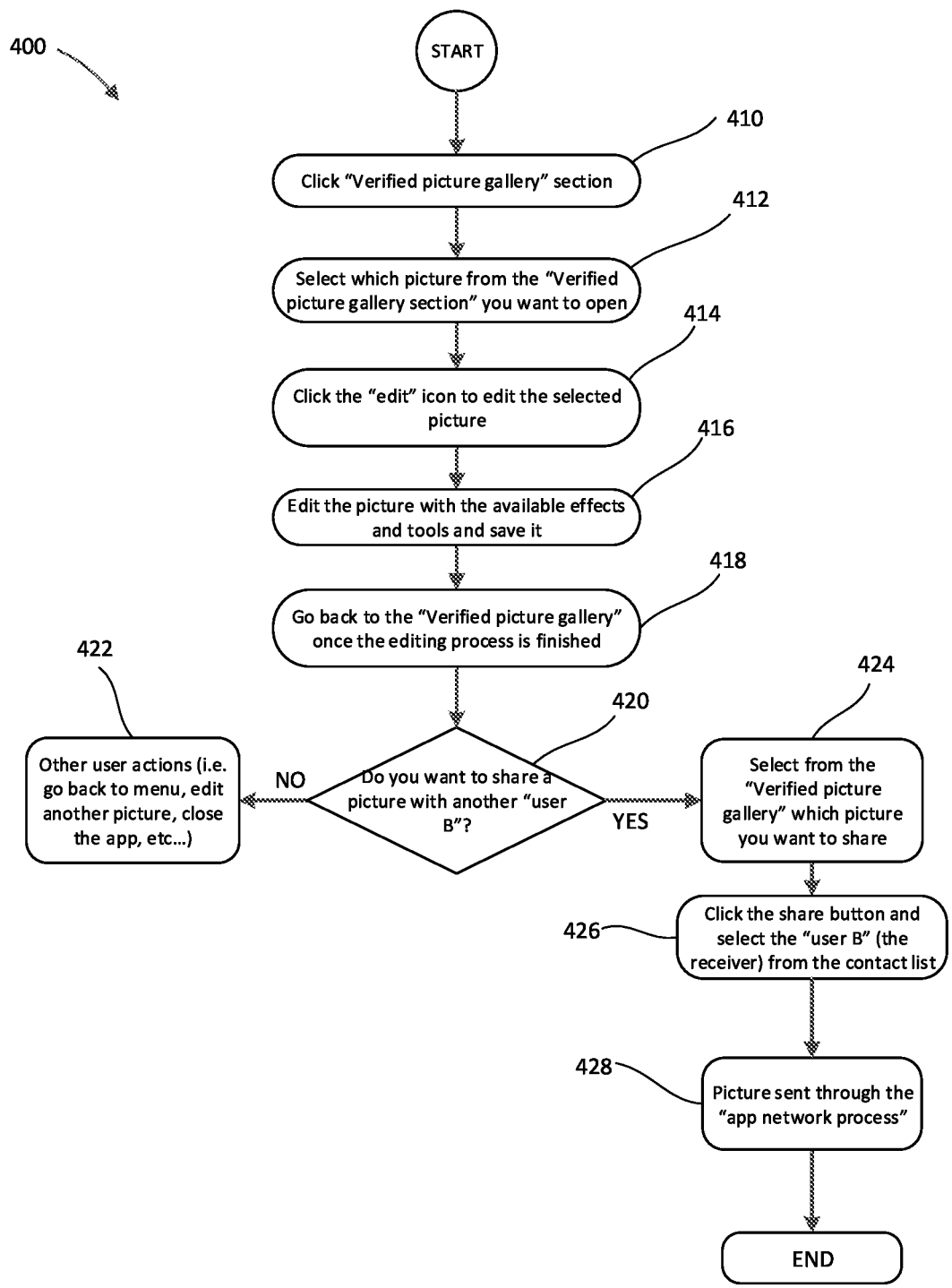
FIG. 4A is a flow diagram of the routine for editing an image in a verified picture gallery and sending the edited image to another user.

FIG. 4A is a flow diagram of a routine for editing and sharing pictures in the verified picture gallery 132. The routine is run through the API 116 that provides a user access to verified pictures of that user stored in the verified picture gallery database 132 in FIG. 1. The routine first accepts an input from the user to select the verified picture gallery (410). The routine then displays an input requesting that the user select the picture from the verified picture gallery they desire to open (412). The routine then displays an interface requesting that the user select the edit icon to edit the selected picture (414). The edits input by the user are accepted (416). The edits may be made with tools provided by the application 140 as explained herein. The routine then returns to display the verified picture gallery for the user (418).

The routine requests whether the user desires to share a picture with another user (422). If the user does not indicate the desire to share a picture, the routine will display an actions menu to provide other actions to the user (422). If the user desires to share the picture, the routine will display a selection interface asking the user to select the picture from the verified gallery to share (424). The user will input a selection from the available pictures in the verified gallery. The routine will display an interface that provides a share button and a selection menu for the user to select between users in a contact list (426). The picture will then be sent through the API 116 to the selected user using the application 140 (428).

FIG. 4B is a flow diagram of an example routine 450 of the options provided to a receiver of a sent picture from the routine 400 in FIG. 4A. The user first selects an in box message board of a message board interface generated by the application 140 (460). The user may then select one of the messages with an indicator such as a yellow camera icon, that indicates the message has an attached image sent by another user (462). The routine will then display the opened message and attached image on the display (464). The routine will then determine if the user wishes to send an image back to the sender of the image (466). If the user does not select this option, the interface proceeds to display a menu of other user actions (468).

If the user decides to send a picture or image back to the sender, the routine will display a selection interface asking the user to select the picture from the verified gallery file associated with the user to share with another user (470). The user will input a selection from the available pictures in the verified gallery file (472). The routine will display an interface that provides a share button and a selection menu for the user to select between users in a contact list (474). The picture will then be sent through the API 116 to the mobile device of the selected user using the application 140 (476).

Users may store multiple pictures saved in their respective verified picture gallery file in the verified picture gallery database 132. Users may select any of the stored verified images for viewing. Once an image is viewed, a user may edit the image such as by cropping, zooming, adding text, colorful collage, flash-on photo, artsy filters such as paint strokes, glitter, gext etc., retro content with distressed appearance, grainy textures, etc., different color shade, bright color enhancer, a glitch effect, black and white photo effect, a monochrome photo effect, a neon edit, and filters. Alternatively, a user may select a no edit feature option that allows recipients to know that pictures have not been edited or processed through with filters.

For example, a user may zoom in on a selected picture to remove his face from the picture to create a new picture. Once the changes are made, the user may confirm the changes and save the edited picture to the verified picture gallery 132. The picture will be marked as edited. The application 140 will display an interface that allows the user to send the edited picture to another user.

When the user operates the application 140 to send the picture, the mobile device 110 sends the picture via the API 116 to another user's message board interface that is displayed on the application on the mobile application of the other user. When the other user accesses the message board interface via a pull down menu, the message will be marked with an indicator of the verification such as a yellow camera icon. When the user selects the yellow camera icon, the sent picture such as the edited picture is displayed on the mobile device 110. Pictures taken by the application 140 will have visible date information when shared or displayed. Pictures not taken by the application 140 will not have visible date information when shared or displayed.

FIG. 5 is a flow diagram 500 of the routine to update the template picture. The user selects a picture to upload after a long period of inactivity (510). The API 116 determines the time elapsed from the uploaded picture to the last picture submitted by the user for the template image stored in the template database 134 (512). The application will send a request whether the user wishes to take a new picture to serve as a template image (514). If the user selects no, the application 140 displays a warning message that the user may not be detected in future picture uploads if the template picture is not updated (516). If the user opts to input a new template image, the application will open an interface to allow the user to take a new facial image (518). The application 140 will then access the routine described in FIG. 2 to replace the template image in the template image database 134 associated with the user.

Alternatively, after a predetermined time, such as one year, the application or API 116 will run the verification routine to remind the user to update a new template image to reflect changes in physical appearance from aging. The user is sent a notification through the application 140 from the API 116 at the appropriate time to request the loading of a new template image. Possible changes in physical appearance may result from aging, disfigurement(s), or other possible changes as a result of plastic surgery, facial clinical disorders, facial reconstructive surgery, facial trauma surgery, facial congenital defect repair(s), and facial cosmetic surgery. Consequently, if the user is unable to upload new pictures into their verified picture gallery, the user will be notified through the application 140 from the API 116 to resubmit a new template image. Once a new template picture is updated it will be stored in the template database 134 and the prior template image will be replaced and not used for verification purposes. Existing pictures in the verified picture gallery which had been approved under the prior template picture will be transferred to the general picture gallery with corresponding notes such as "this was once a Verified Picture," picture was edited, date and time stamps etc.

FIG. 6A is a flow diagram 600 of a routine for editing images or pictures stored in the general picture gallery 130 in FIG. 1 and sending the image or picture to another user. The users of the API 116 and the application 140 may have multiple pictures or images saved in their respective general picture gallery stored in the general picture gallery database 130.

A first user selects one of the pictures stored in their general picture gallery from the general gallery database 130 to edit cropping, zooming, and add text (610). For example, a user may zoom in on a selected general gallery picture to remove his face from the selected picture (612). Once the user has completed the edits, the user confirms the changes and saves the selected picture to the general picture gallery as an edited picture (614). The user may then select the edited general gallery picture to be transferred to a second user (616). The API 116 allows the transfer of the selected edited picture based on the user input to the application 140 to the second user (618). The API 116 transfers the edited picture to the message board inbox (620). The edited picture is converted with an indicator of a general gallery picture such as a black camera icon.

FIG. 6B is a flow diagram 650 of a routine that allows a receiving user to manipulate received images for the general picture gallery associated with the user that is stored in the general picture gallery database 130. The receiving user first selects an in box message board of a message board interface generated by the application 140 (660). The user may then select one of the messages with an indicator such as a black camera icon, that indicates the message has an attached image sent by another user from the general picture gallery of the sending user (662). When the receiving user selects the picture to view by selecting a symbol on the message such as the black camera icon, the API 116 will send the selected edited picture to the screen of the mobile device 110 for viewing (664). The selected edited picture will not have a date stamp. However, if the edited picture was taken by the application 140 of the sending user in conjunction with the API 116, the time stamp information will be displayed with the edited picture. The routine will then determine if the user wishes to send an image back to the sender of the image (666). If the user does not select this option, the interface proceeds to display a menu of other user actions (668).

If the user decides to send a picture or image back to the sender, the routine will display a selection interface asking the user to select the picture from the general picture gallery file associated with the receiving user to share with another user such as the sending user (470). The receiving user will input a selection from the available pictures in the verified picture gallery file or general picture gallery associated with the receiving user (472). The routine will display an interface that provides a share button and a selection menu for the user to select between users in a contact list (474). The picture will then be sent through the API 116 to the mobile device of the selected user using the application 140 (476).

For example, if a user has selected to view one of the pictures in their general gallery, the user may access an interface from the application 140 to edit using crop, zoon or add in text. For example, the user may zoom in on a picture to remove their face from the picture. The user confirms the changes and the edited picture is saved to the general picture gallery.

When the user operates the application 140 to send the edited picture to another user, the mobile device 110 sends the picture via the API 116 to the message board of the user. A message interface is displayed on the application on the mobile application of the other user. When the other user accesses the message board interface via a pull down menu, the message will be marked with an indicator of a picture from a general picture gallery such as a black camera. Once the receiving user selects the indicator, the edited picture will be sent for viewing on the mobile device. Pictures taken by the application 140 will have visible time stamp information when shared or displayed. Pictures not taken by the application 140 will not have visible time stamp information when shared or displayed.

Figure 7:
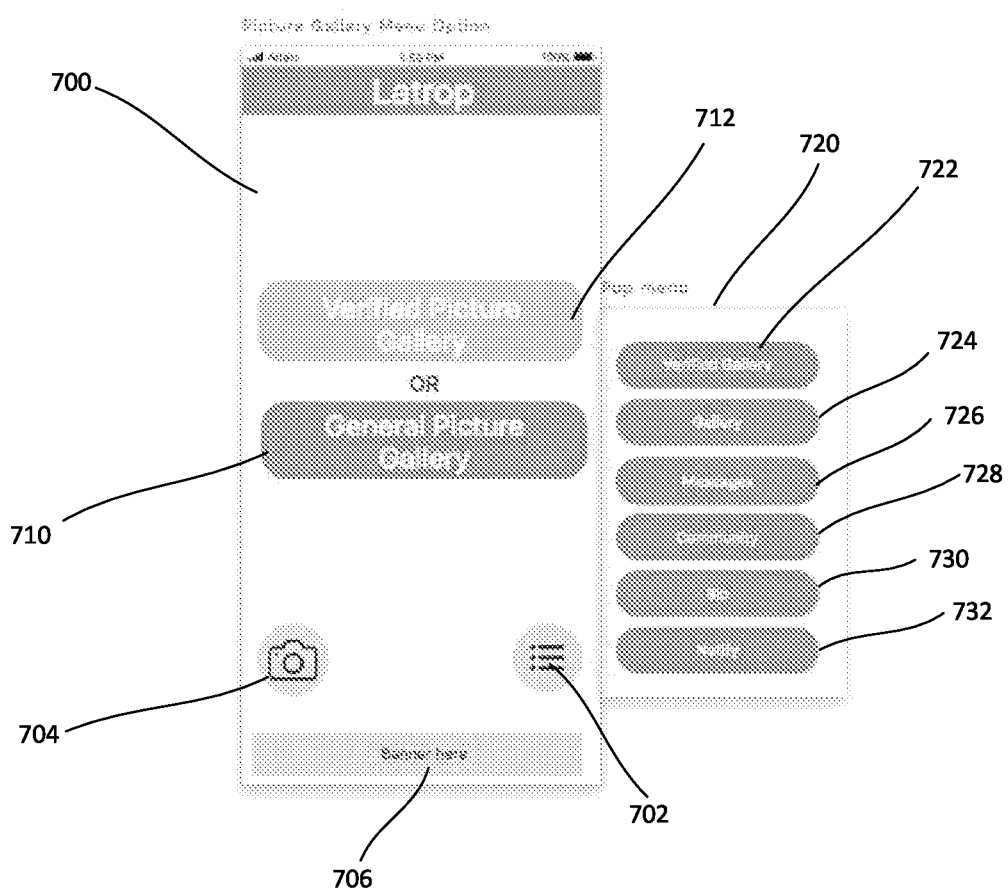
FIG. 7 is a screen image of an interface generated by the application to access operations of the facial recognition system.

FIG. 7 is a screen image of an initial interface 700 generated by the application 140 in communication with the API 116. The interface 700 allows a user to access all pictures associated with the user in either the verified picture gallery database 132 or the general picture gallery database 130. The interface 700 includes a pop up menu icon 702, a capture image icon 704, a banner field 706, a general gallery button 710 and a verified gallery button 712. A pop up menu 720 shows the options when the pop-up menu icon 702 is selected. In this example, the pop up menu icon 702 and the capture image icon 704 are displayed on other interfaces such as those described below by the application 140.

As explained above, pictures that are biometric matches of the template image are stored in the verified picture gallery associated with the user in the verified picture gallery database 132, while non-biometric matches are stored in the general picture gallery associated with the user in the general picture gallery database 130.

The banner field 706 may include a variety of graphics or videos such as for advertising for parties that may utilize the application 140 or sponsor the application 140 or for other commercial purposes. The banner field 706 may also be used for additional information for the user or other purposes.

When the pop-up menu icon 702 is selected, the pop-up menu 720 is displayed. The pop-up menu 720 includes a verified gallery option 722, a general gallery option 724, a messages option 726, a community option 728, a bio option 730, and a notify option 732. In this example, the gallery option 722 has been selected that results in the display of the general gallery button 710 and the verified gallery button 712 shown in FIG. 7. The messages option 726 displays a message board with messages received from other users. The community option 728 allows access to common interfaces with other users with similar interests. The bio option 730 allows the user to edit their bio information that may be sent to other users. The notify option 732 when selected sends a specific notification such as a health notification and/or natural hazard notification to another user.

When the community option 728 is selected, the user is provided access to an interactive communication forum created for users of the present invention to share their thoughts, interest, concerns, health status, natural hazard status location (such that they abide by the terms of service agreement). More specifically, the community interface may be where users can share all available information, features and functions described in the message board of the application 140, write text, embed emojis, and/or share pictures or videos from the verified picture gallery or general picture gallery to other users of the API 116. Users may share subject matters from the community page, verified gallery pictures, general gallery pictures, or notifications with outside individuals via a weblink. This weblink or URL will have an expiration predetermined by the user who will be able to copy this generated link and paste it on any email, text message, or other virtual communication community apparatus.

In the event the user wishes to share topics from the community page that have specific topics such as health related information, the user may use anonymous send messages to other users in the same manner as is described above, except that the weblink will be sent directly from the API 116 without any identifying pictures or descriptions of the original user.

Figure 8A:
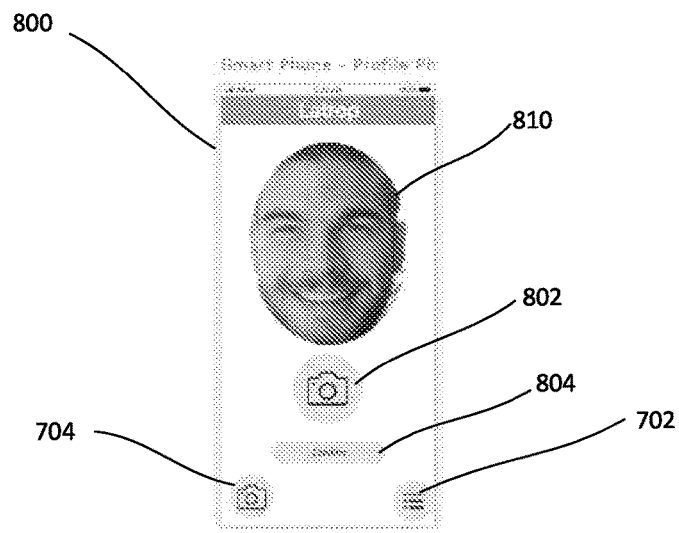
FIG. 8A is a screen image of a picture capture interface used the enrollment in the system.

FIG. 8A shows an interface 800 that is generated by the application 140 when the capture image icon 704 is selected. The interface 800 includes a picture capture icon 802 that when pressed takes an image from the camera of the mobile device 110 using the pre-processing API 142 in FIG. 1. The interface 800 also includes a confirmation button 804, that when selected, will activate the enrollment routine detailed in FIG. 2 to store the captured picture as the template image if the user does not have a template image in the template image database 134. The confirmation button 804 will engage the API 116 to decide whether to save the picture in the verified picture gallery for the user in the verified picture gallery database 132 or the general picture gallery for the user in the general picture gallery database 130. An image captured by the interface 800 such as a self-image 810 of the user is displayed.

Figure 8B:
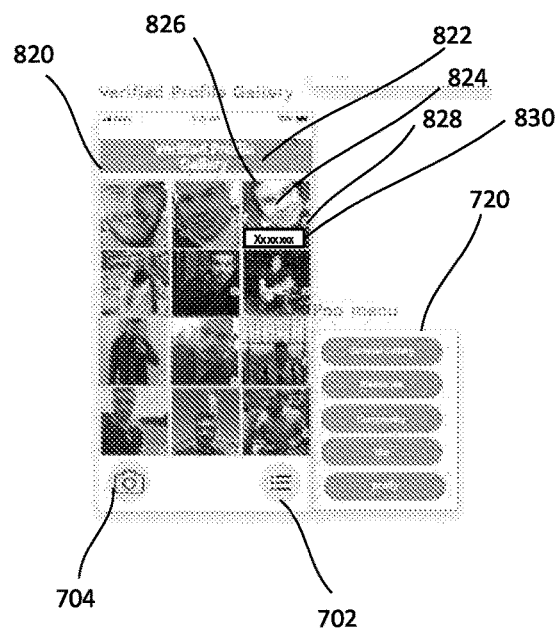
FIG. 8B is a screen image of an interface displaying a verified picture gallery associated with a user.

FIG. 8B shows an interface 820 that is displayed by the application 140 when the verified picture gallery button 712 is selected from either the interface 700 in FIG. 7 or from the pop-up menu 720. The interface 820 includes a collection of verified profile pictures 822 of the user. The verified profile pictures 822 includes the template image, which in this example is the picture in the upper left top row of the pictures 822. The pictures in the collection of verified profile pictures 822 do not include any other people other than the user. All images in the verified picture gallery associated with the user are verified by the API 116 using the verification process explained above. When the pictures in the verified picture gallery are displayed in the collection 822, each of the pictures such as a picture 824 include a specific indicator such as a yellow picture border 826 and/or a yellow check symbol 828. If the picture is taken using the application 140 with the camera on the mobile device, a time stamp 830 will appear on the picture, such as the picture 824, in the collection of profile pictures 822. The time stamp 830 indicates the date and time the picture was captured by the application 140.

Figure 8C:
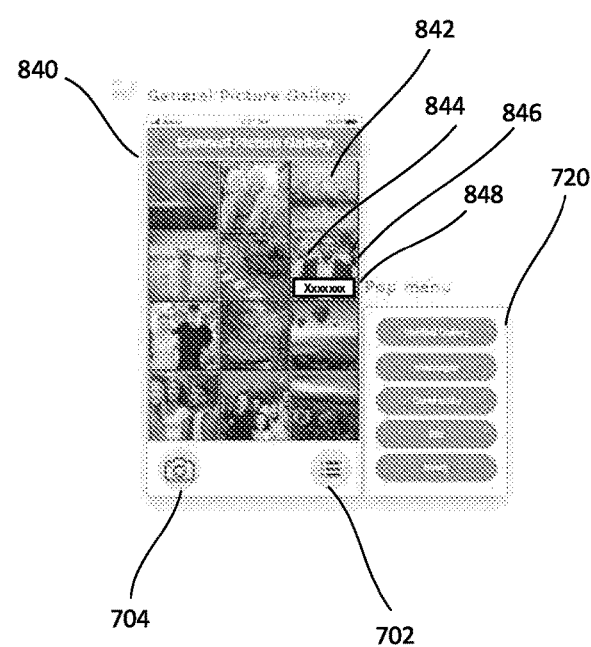
FIG. 8C is a screen image of an interface displaying a general picture gallery associated with the user.

FIG. 8C shows an interface 840 that is displayed by the application 140 when the general picture gallery button 710 is selected from either the interface 700 in FIG. 7 or from the pop-up menu 720. As explained above, the general picture gallery associated with the user includes all images that did not meet the requirements to be saved in the verified picture gallery. For example, such images may include images that show other people, images that cannot be verified, or images that do not show any people. As explained above, images in the general picture gallery for a user are approved by the process described herein operated by the API 116. The pictures are displayed in the interface 840 in a collection of pictures 842. Each picture, such as a picture 844, is assigned an indicator such as a black border 846 to signify that it is in the general gallery associated with the user. The picture or images in the collection are not assigned an icon such as the yellow check mark that is only shown with verified pictures. If the picture was captured with the application 140, a time stamp 848 will occur on the picture indicating when the picture was captured. If the picture is not taken by the application, the time/date stamp will not appear on the picture.

FIGS. 9A-9C are screen images of interfaces generated by the application 140 for the process of transferring an image from a general picture gallery to a verified picture gallery for a user. FIG. 9A shows an interface 900 that displays a picture 902 selected from the general picture gallery collection 842 in FIG. 8C. A user may edit the picture 902 using tools, such as a crop tool to crop out parts of the image. In this example, standard or specialized editing or effects tools in relation to example effects described above may be provided. In this example, the picture 902 includes the user and another person, and therefore cannot be a verified picture. The user may thus crop out the other person in the picture to transform the edited picture into a verified picture.

FIG. 9B shows an interface 910 that displays an edited picture 912. In this example, the edited picture 912 is the result of applying the cropping tool to the picture 902 in FIG. 9A. In this example, the other person from the picture 902 has been cropped out of the picture 912. A date stamp 914 is applied to the picture 912 indicates the time and date the picture 812 was edited. The interface 910 includes a confirm button 920 that results in the picture 912 being sent to the API 116 in FIG. 1. The API 116 will access the match processor 124 to compare the picture 912 with the template image of the user and based on the results, will assign the picture to either the general picture gallery or the verified picture gallery of the user. As explained herein, the picture 912 will be verified to be an image of the user and the match processor 124 ensures the picture 912 meets the other criteria of a verified picture such as only showing the user. The edited picture 912 thus is stored in the verified picture gallery for the person in this example.

FIG. 9C shows an interface 930 that allows the display of the edited picture 912 after being stored in the verified picture gallery. The edited picture 912 will be displayed as part of the collection of verified images 822 shown in FIG. 8B. In this example, a yellow border 932 and a yellow check mark icon 934 are provided for the edited picture 912 to indicate it has been verified and is part of the verified picture gallery of the user. A date stamp is displayed on the edited picture 912 if the picture was taken by the application 140.

FIG. 10A-10B is an interface of a message board interface 1000 that is activated by selecting the message board option 726 in the pop-up menu 720 in FIG. 7. The message board interface 1000 includes options that allow a user to perform different actions such as a call option 1010, a contacts option 1012, a camera option 1014, a chat option 1016, and a video option 1018. The interface 1000 also includes a displayed image 1020 that is from the verified picture gallery for the user.

The chat option 1016 allows the user to send messages to other users of the API 116. The contacts option 1012 allows a display of contacts (other users) associated with the user. The call option 1010 allows a call to be placed to a selected contact. The video option 1018 allows a user to record a video file. The recorded video may be stored in a user associated gallery in a separate database. The video may also be verified in relation to identity of the user via the process described above. Thus, video files may be stored in the verified gallery or the general gallery associated with the user in the same manner as pictures or images. A health icon 1022 may be displayed that indicates that a health message has been received. Other specialized icons relating to other applications such as hazards may be displayed indicating messages relating to the application.

The message board interface 1000 includes a list of contacts field 1030. Each of the contacts in the contact listing 1030 are listed by the most recent correspondence, but other listing orders may be selected by the user such as by alphabetical order. A contact will have different icons that indicate different images sent by the contact. Each of the contacts in the contact listing 1030 will include an image of the contact (user) and a name field. Certain contacts are unverified such as a name field 1032 and an image 1034 of the contact will be displayed without a verification designator. Other contacts will include a verified image indicator. For example, a name field 1036 includes an image 1038 of the contact with a yellow border that indicates that the image is a verified image of the contact that has been verified through the API 116.

Each of the contacts in the list of contacts 1030 also has associated icons indicating message type and image or picture type received from the contact. For example, a verified image icon such as a yellow camera icon 1040 indicates a verified picture has been sent by the contact, while another general image icon such as a black camera icon 1042 indicates that an unverified picture, such as a picture from a general picture gallery, has been received. A message icon will indicate the type of message that is associated with the image. For example, a chat icon 1044 indicates that a chat message has been received from the contact while a group message icon 1046 indicates the receipt of a group message. Multiple messages are indicated by a number indicating the number of pictures or messages.

FIG. 11A is a bio page interface 1100 generated by the application 140 for an unverified user that is accessed by the bio option in the pop up menu 720. The interface 1100 allows a user to edit various fields under their bio. In this example, the bio page interface 1100 includes an image of the user 1110. In this example, an indicator such as a black border indicates that the user and the picture of the user is unverified. In this example, the interface 1100 includes personal fields such as a general bio field 1120, a goals field 1122, a pet peeves field 1124, a women field 1126, and a men field 1128. A save button 1130 allows a user to change edits to the information in the fields. The bio information in the interface 1100 may be accessed by other users who receive unverified pictures of the user. In this manner, a user that receives an unverified image from another user may view other details relating to the other user.

FIG. 11B is a bio page interface 1150 generated by the application 140 for a verified user accessed by the bio option in the pop up menu 720. The interface 1100 allows a user to edit various fields under their bio. In this example, the interface, the interface includes an image of the user 1160. In this example, an indicator such as a yellow border and a yellow check mark icon 1162 indicates that the user and the picture of the user is verified such that the image 1160 originates from the verified picture gallery of the user. In this example, the interface 1100 includes personal fields 1170 such as a general bio field, a goals field, a pet peeves field, a women field, and a men field. A save button 1172 allows a user to change edits to the information in the fields. The bio information in the interface 1160 may be accessed by other users who receive verified pictures of the user. In this manner, a user that receives a verified image from another user may view other details relating to the other user.

FIG. 12A is a phone call interface 1200 that is generated by the application 140 when a phone call is received from a verified user. The application 140 operates in conjunction with the software that operates the call to verify the picture of the caller. The interface 1200 displays the name of the user and their phone number as well as a verified image 1210. The verified image 1210 includes visual indicators such as a yellow border and a yellow check mark icon 1212 that indicates that the image of the calling user is verified. The interface 1210 also includes standard phone controls such as a volume button 1220, a video camera option 1222, a mute option 1224 and a hang up option 1226.

FIG. 12B is a video call interface 1250 that is generated by the application 140 when a video call is received from a verified user. Similar to the phone call, the video call interface 1250 may access the verification application to show a verified picture of the user who is placing the video call.

The flow diagrams in FIGS. 2-6B are representative of example machine readable instructions for the different routines run by the system 100 in FIG. 1. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 2-6B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Other applications may use some or all of the components of the system 100 in FIG. 1. For example, multiple accounts created by one person will not be perceived as different and distinct account holders for users of the system 100. The authentication process with a template image from the template image database 134 establishes a one to one ratio between one account and one single user of the system. For instance, online social media platforms will be able to exactly standardize online metric usage to a verified user based on the verification process, and therefore exactly determine a singular user's monthly, daily, and hourly activity. Users can only have a single biometric account/data and therefore each user has unique biometric data based on their template image. This careful analysis allows for one account holder on the system 100 in contrast to the current norm of being allowed to open and function unlimited accounts as distinct users with different profile faces when in fact it is one person trying to catfish.

Furthermore, by standardizing on line metric single user usage, online platforms and other service providers will know for certain customer related metrics such as customer depth and engagement are accurate. Consequently, providers will save resources by being confident that data is not being gathered from multiple accounts associated with the same user and specifically target its users using concrete analytics and demographic certainty. For example, online marketing agencies and advertiser pay online companies on Cost Per Click (CPC) and is based on Return on Investment (ROI). This analysis is based on the number of user accounts a company has on their platform. Thus, multiple accounts e.g. (Public, Personal, and Business Account), or multiple email accounts can be associated with a single user. In all of these scenarios, for accounting purposes, advertisers treat every single account as distinct account users when in fact they are the same users. The verification of unique users provides better analytics and decision making when deciding a target audience and how much to spend on CPC and ROI.

Another example application may be in the medical field. Currently, multiple medical files created by one person or patient are perceived as different and distinct medical records. The authentication of a person's medical profile picture using the system 100, also establishes a one to one ratio: one patient to one profile picture for one consolidated medical history record. For instance, when seeking medical coverage, patients routinely check in for a medical visit and have the ability to confirm their identity, explain past medical history etc.

However, in an emergency, that same individual may be unresponsive or unable to speak, thereby unable to assist medical professionals in the diagnosis, emergency treatment or cure. Consequently, health care organizations will provide better treatment and save lives with the verification of patient identities. In this application, the first human profile picture captured by a medical application using the principles of the system 100 may be saved in a verified profile gallery. All subsequent pictures captured by the medical provider will follow the verification process described above. Upon verification, the provided picture captured by the medical provider allows access to the medical records of the patient. Such records may be consolidated from different sources and made available to health care practitioners and or the medical insurance coverage department.

Another medical application is a health indicator used with the example messaging feature. Thus, a health message icon such as a heart symbol is enabled for customers who have an authenticated picture in the verified picture gallery in the verified picture database 132. The health/heart indicator on the interface will light up to red if there is a medical message is received. If no message is received the indicator will be displayed in grayscale. This feature allows a user to send a medical health status alert (i.e., a Positive COVID Result, a Positive STD Result, etc.) to another recipient. The user may send these test results with their profile name attached or send them anonymously. If the test results are input by the user, the recipient will be informed that it was provided by the sender. If the verification application 140 is linked with an application that allows communication between a health care facility and a patient, the recipient will be notified that this information is not only being provided by the sender but that it is also on record with a health care facility or a testing laboratory.

This feature promotes and encourages users to more easily share their health status in a manner which allows for anonymity or not, and encourages people to be aware of other people's/friends health status. If there has been a physical engagement with the recipient, the user will be encouraged to seek medical attention. The recipient of this message can be assured that the informant is a real human being who has been vetted through the verification system 100. This provides assurance that the message is not a spoof or misrepresentation of another person's identity or health condition. Ultimately, this feature may automate and accelerate medical case investigation and contact tracing in relation to controlling disease or pandemic spread.

In another application for banking and financial transactions, the first human profile picture captured by the system 100 is used as a template image and stored for the banking application. All subsequent pictures captured by a mobile banking customer follow the verification process. Upon verification, if the template image matches the image captured by the banking customer, access to the banking account or other financial accounts by the customer will be authorized.

In another application for email account verification, the first human profile picture captured by the email account application is saved in a verified profile gallery accessible by the email application. All subsequent pictures captured by the email user will follow the verification process described above. Upon verification, the template image is matched with subsequent images captured by the email user. Verification allows access to the Email account of the user. Thus, email users will be able to send emails with a verified picture of themselves to recipients and therefore securely verify their identity as the sender of the email.

In another application, the principles described herein may be used for a phone application. The first human profile picture captured by the phone application is saved in a verified profile gallery accessible by the phone application. All subsequent pictures captured by the phone user will follow the verification process described above. Upon verification, the template image is matched with subsequent images captured by the phone user. Access to the phone account of the user is authorized and transmitted to the recipient of a phone call. In this example phone application, phone users will be able to make calls with a verified picture sent to recipients.

In another application relating to text messaging, the first human profile picture captured by the text application is designated as the template image and saved in the verified profile gallery 132 within the example verification processes. All subsequent pictures captured by the user will follow the verification process described herein. Upon verification, if the template picture matches pictures captured by the text user, access to the text message account will be authorized and transmitted to recipient of a text message. The verification may be used for other application such as making calls with a verified picture to recipients.

In another application, the principles described herein may be used for a video conferencing application. The first human profile picture captured by the application is saved in a verified profile gallery accessible by the video conferencing application. All subsequent pictures captured by the phone user will follow the verification process described above. Upon verification, the template image matches that the image that was captured by the email user, access to the video conferencing account will be authorized for the user. Users will be able to link a verified profile picture to the video conferencing application.

In another application, the principles described herein may be used for taxi or ride sharing. The first human profile picture captured by the application is saved in a verified profile gallery accessible by the phone application. All subsequent pictures captured by the phone user will follow the verification process described above. Furthermore, if the taxi company stores an employee identification picture, the above described process will also use this picture as the template image for verification of the driver.

Another method of verification that may be supported by the above described system of the fixing other biometric features such as the ears of a person. Because of the immense diversity of ear shapes, sizes, and other identifying attributes, ear data may be another verification point in the verification processes. This additional layer of authentication requires the human face features from the facial image but also integrates the human ear side profile biometrics with the verification of a user. Ear data may be derived from a video of a person taken from one ear to the other which would simultaneously capture the human face. This step would then be processed in the same manner by the match processor 124 as other images explained above.

The additional verification through ear based or infrared biometrics could be employed by a user of the API 110 in conjunction with an application that uses the API 116 for verification. The application 140 provides an option for high level verification on an interface. The interface allows the user to capture a video that pans over from the first ear to the face and then pan over to the second ear uninterrupted. The application 140 saves this digital information for additional verification. The short video in which a digital recording is done to capture their face and both ears uninterrupted is processed by the API 116. The application 140 may provide an option for using infrared pictures to verify if the picture that is captured is of a living person giving off a "heat signature." The interface allows the user to capture an infrared picture for verification to be processed by API 116.

Figure 13:
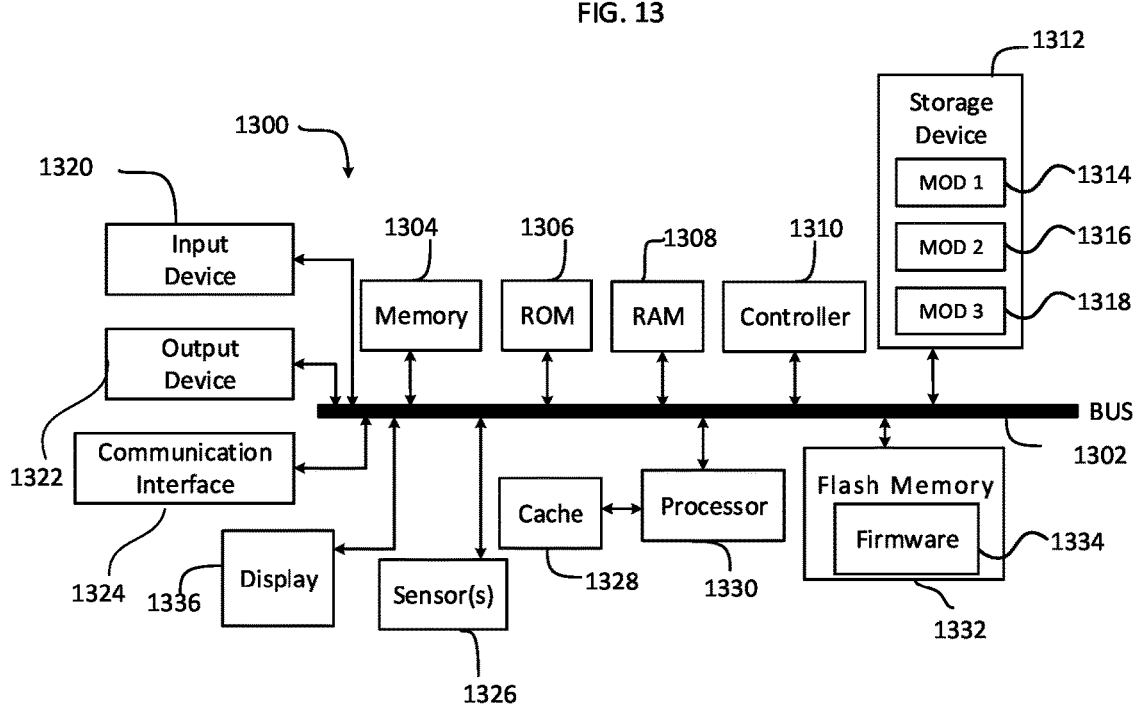
FIG. 13-14 are block diagrams of example computer hardware for executing the system in FIG. 1.
Figure 14:
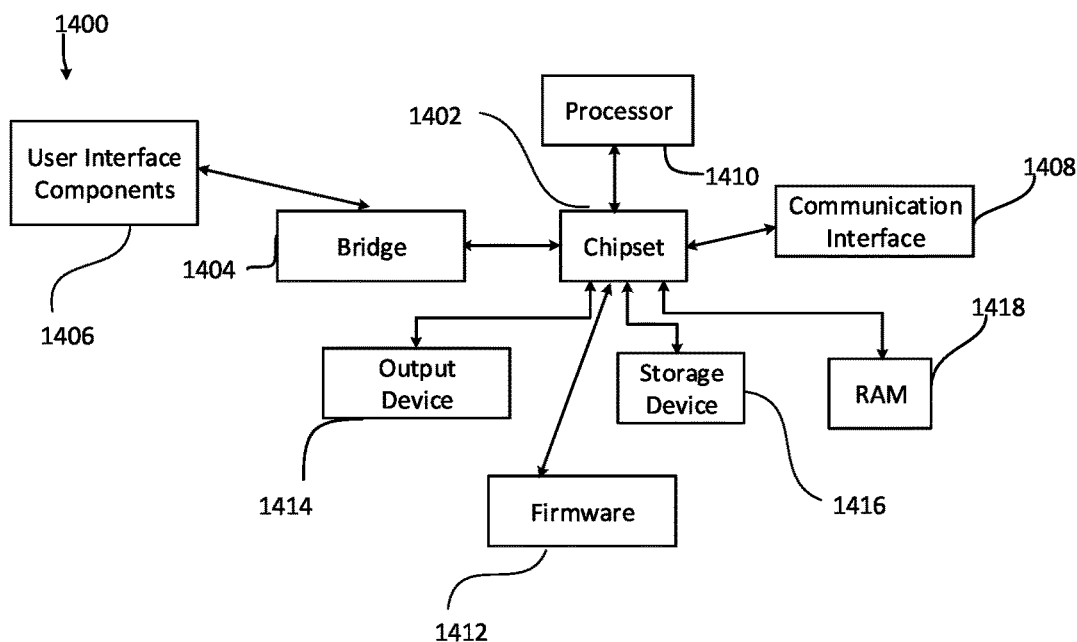

FIGS. 13-14 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 600 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 600 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 14 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIG. 13) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for verifying the identity of a user, the system comprising:
   a computing device interface for receiving a facial image from a computing device of the user;
   a facial feature extractor module that receives the facial image and determines an infrared identifying signature from the facial image;
   an image template database coupled to the facial feature extractor module, the image template data base storing a template image associated with the user; and
   a match processing module operable to;

determine whether there is a facial image of the user in the picture and whether there is another person in the picture;

activate the facial feature extractor module to determine infrared identifying signature from the infrared feature of the facial image of the user;

receive the facial image and verify the facial image with the identity of the user by comparing the determined identifying infrared signature with the template image;

store the facial image as a verified image in the verified image gallery associated with the user in a verified image database if verification is determined; and store the facial image in a general image gallery associated with the user in the general image gallery database if verification is not determined or if there is another person in the picture.

2. The system of claim 1, wherein the interface on the computing device allows a display of verified images in the verified image gallery, wherein the displayed images are marked with an indication of verification.

3. The system of claim 2, wherein the computing device is operable to access an image from the verified image gallery for transmission to another computing device, wherein the transmitted image includes an indicator that the image is verified.

4. The system of claim 2, wherein the computing device is operable to edit an image stored in the general image gallery associated with the user to meet the criteria of a verified image, and wherein the match processor module is operable to store the edited image in the verified image gallery.

5. The system of claim 1, wherein the verification includes determining biometric features from the facial image, comparing the biometric features with those of the template image, and verifying if the biometric features exceed a predetermined threshold in comparison to the template image.

6. The system of claim 1, wherein the verification includes determining whether there is another person in the facial image, or whether the facial image does not show any persons.

7. The system of claim 1, wherein a time stamp is applied when the image is obtained by the application on the computing device wherein the computing device is operable to edit the image, and wherein a time stamp is applied when the image is edited.

8. The system of claim 1, wherein the computing device is operable to display a message board including indicators of a message from another user and an indicator that a verified image of the another user is attached to the message.

9. A mobile computing device including an application operable to provide verification of an image of a user, the computing device comprising:

a display;

a camera operable to capture an image with an infrared biometric signature;

a controller operated by the application to:

capture an image with the infrared biometric signature via the camera;

determine whether there is a facial image of the user in the captured image and whether there is another person in the captured image;

verify whether the captured image shows the user based on the infrared biometric signature in comparison to an infrared biometric signature of a template image of the user;

storing the captured image as a verified image of the user in a verified image gallery associated with the user in a verified image database if the captured image is verified; and store the captured image in a general image gallery associated with the user in the general image gallery database if the captured image is not verified or if there is another person in the captured image.

10. The mobile computing device of claim 9, further comprising a transceiver, wherein the controller is further operable by the application to allow the user to select one of the verified images to be sent to another device via the transceiver.

11. The computing device of claim 10, wherein the displayed verified images are marked with an indication of verification and wherein the controller is operable to select a verified image from the display for transmission to another computing device, wherein the transmitted image includes an indicator that the image is verified.

12. The mobile computing device of claim 9, wherein the verified image is verified if the user is alone in the image.

13. The mobile computing device of claim 9, wherein the controller is operable by the application to edit an image stored in the general image gallery associated with the user to meet the criteria of a verified image, and wherein the controller is operable to store the edited image in the verified image gallery.

14. A method of verifying the identification of an image of a user comprising:

storing a template image associated with the user in a template image database;

receiving a facial image having an identifying infrared signature from a computing device operated by the user;

determining whether there is a facial image of the user in the image and whether there is another person in the image;

determining an identifying infrared signature from the facial image via a facial feature extractor module; and verifying the facial image with the identity of the user by comparing the identifying infrared signature with those of the stored template image via a match processor;

storing the facial image as a verified image in a verified image gallery associated with the user in a verified image database if the facial image is verified; and storing the facial image in a general image gallery associated with the user in the general image gallery database if the facial image is not verified or if there is another person in the image.

15. The method of claim 14, further comprising:

displaying an interface on the computing device having verified images in a verified image gallery associated with the user in a verified image gallery database, wherein the displayed images are marked with an indication of verification.

16. The method of claim 14, further comprising accessing an image from the verified image gallery for transmission to another computing device, wherein the transmitted image includes an indicator that the facial image is verified.

17. The method of claim 14, further comprising generating an interface allowing editing an image stored in the general image gallery associated with the user to meet the criteria of a verified image, and storing the edited image in the verified image gallery.

* * * * *